United States Patent Office 3,000,473
Patented Sept. 19, 1961

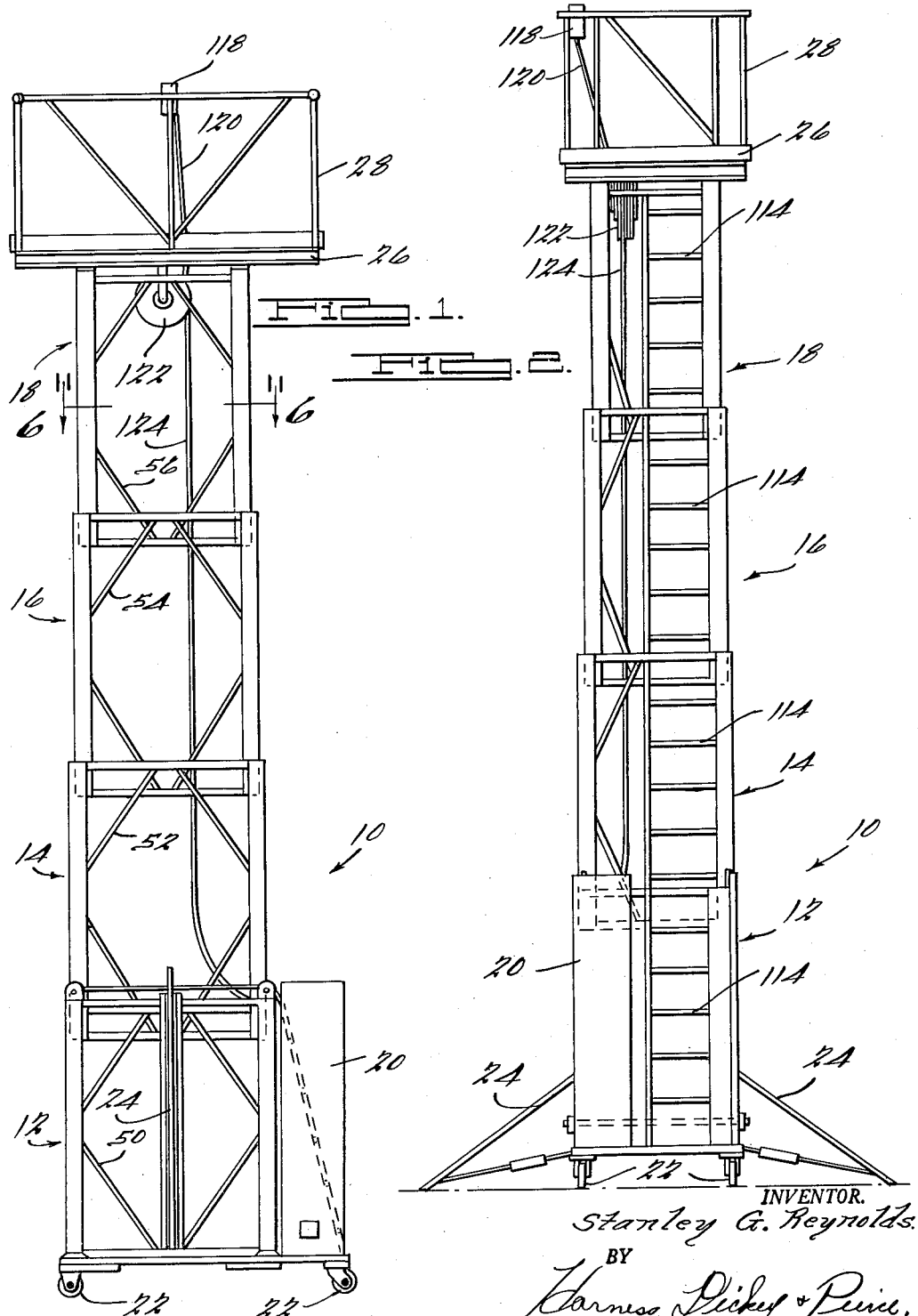

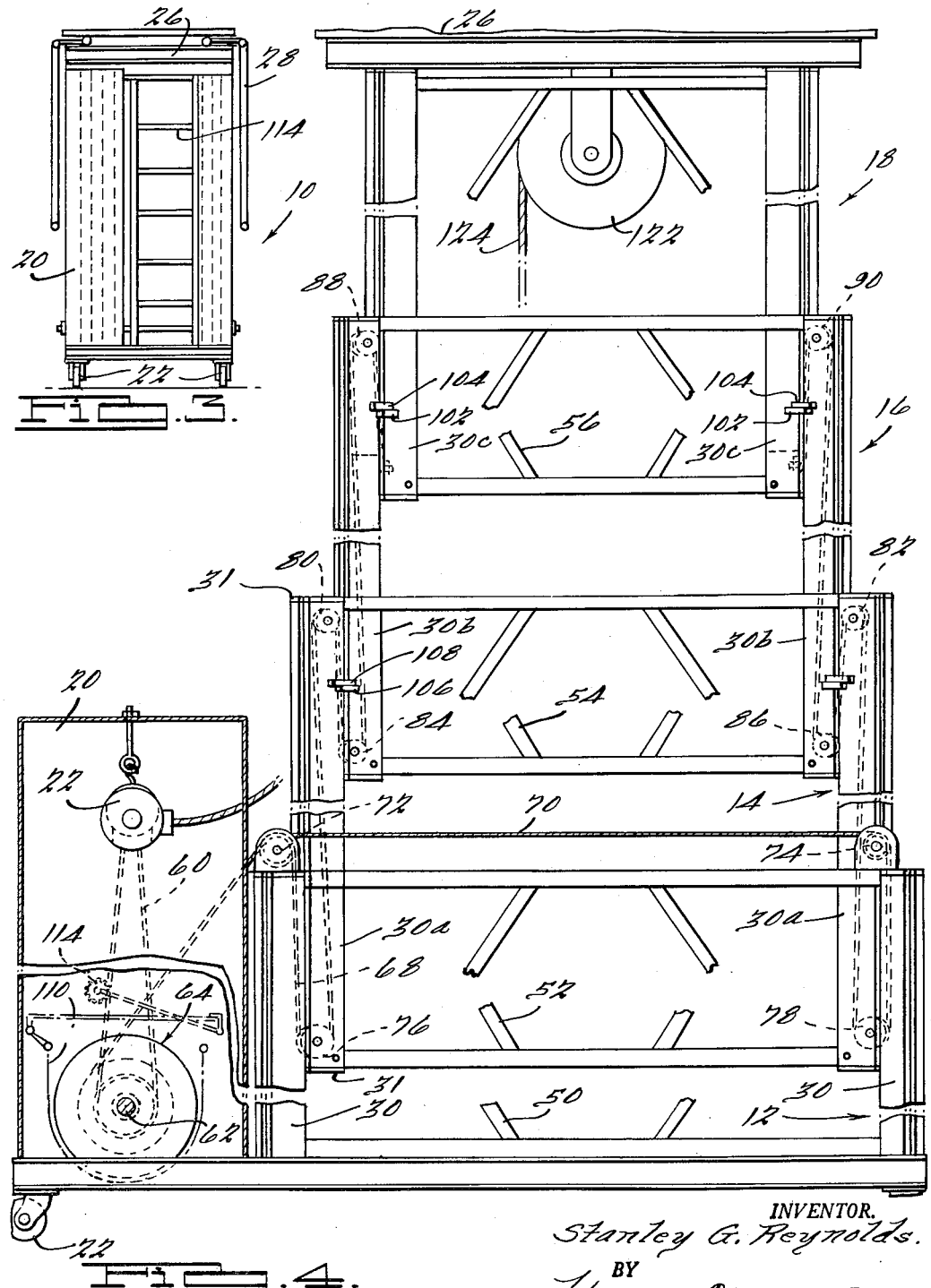

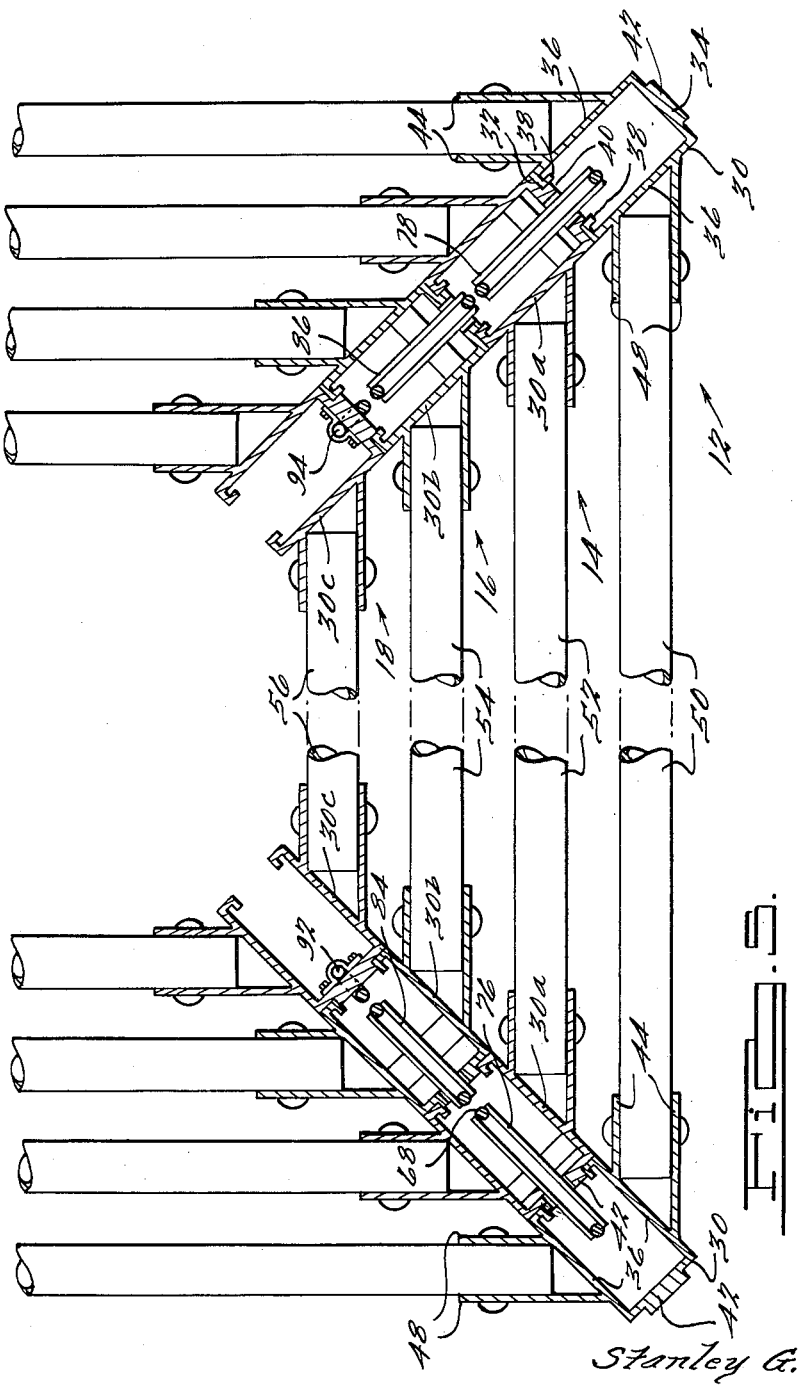

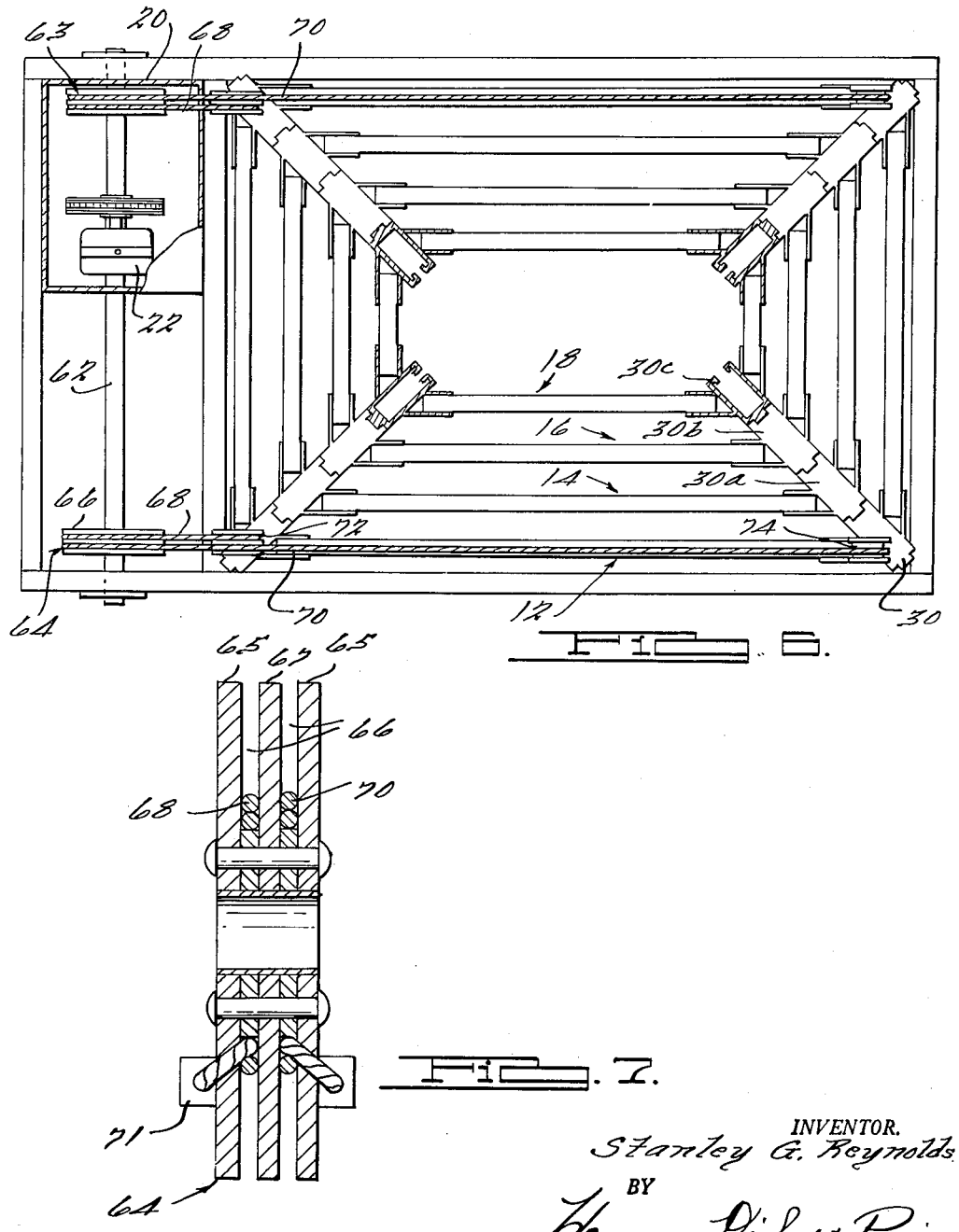

3,000,473
TELESCOPING TOWER
Stanley G. Reynolds, Muskegon, Mich., assignor to Reynolds Televator Corporation, a corporation of Michigan
Filed Dec. 2, 1958, Ser. No. 777,680
6 Claims. (Cl. 189—14)

This invention relates generally to elevating apparatus and more particularly to an improved telescoping tower.

An object of this invention, therefore, is to provide an elevating tower which is compact, when retracted, to facilitate movement and transport of the tower, can be readily extended to full height, has all of the lift cables enclosed at all times to prolong the life thereof and maintain the cables in a clean condition, and which provides a tongue and groove assembly of adjacent telescoping sections to provide for a firm support of each section on the adjacent lower section on which it is supported.

A further object of this invention is to provide a telescoping tower which is simple in construction, economical to manufacture and efficient in operation in elevating men and equipment to a desired height.

Further objects, features and advantages of this invention will become apparent from a consideration of the following description, the appended claims and the accompanying drawing in which:

FIGURE 1 is a front elevational view of the tower of this invention, showing the tower extended to its full height;

FIG. 2 is a side elevational view of the tower of this invention, illustrated similarly to FIG. 1;

FIG. 3 is a side elevational view of the tower of this invention showing the tower in a fully retracted position;

FIG. 4 is a front elevational view of the tower of this invention, with some parts broken away and other parts shown in section for the purpose of illustrating the location of the lift cables for the tower;

FIG. 5 is an enlarged horizontal sectional view of a portion of the tower of this invention;

FIG. 6 is an enlarged sectional view looking substantially along the line 6—6 in FIG. 1; and FIG. 7 is a sectional view of one of the cable winding spools in the tower of this invention.

With reference to the drawing, the telescoping tower of this invention, indicated generally at 10, is illustrated in FIGS. 1 and 2 as including a plurality of telescoping frame sections, namely, a base section 12, a first intermediate section 14 supported on the base section 12, a second intermediate section 16 supported on the first intermediate section 14, and a platform supporting section 18 supported on the section 16. The base section 12 carries a supporting housing 20 for an electric motor 22 (FIG. 4) which operates, in a manner hereinafter described, to extend the tower 10. The base section 12 is supported on casters 22 and carries foldable outriggers 24 which are operable to stabilize the tower 10 in a desired position. The top section 18 carries a platform 26 which is provided with a railing 28 that is formed of four separable sections adapted to be folded downwardly as shown in FIG. 3 so that the railing does not substantially increase the size of the retracted tower.

The frame sections 12, 14, 16 and 18 are substantially identical, each consisting of an open framework of rectangular shape in both horizontal and vertical profile, and differing only as regards their sizes. As shown in FIGS. 1 and 2, the base section 12 is of a size such that the section 14 may be telescoped downwardly within the section 12, and the section 16 can likewise be telescoped within the section 14 and is of a size such that the section 18 can be telescoped within the section 16. To facilitate relative movement of the frame sections, the sections 14, 16 and 18 are tapered slightly so that they are smaller at their lower ends than they are at their upper ends. For purposes of illustration, only the four sections are illustrated, it being understood that more than two intermediate sections are utilized if a higher tower is desired.

As shown in FIG. 5, the base section 12 consists of four corner posts 30, only two of which are shown, each of which is hollow and of a generally rectangular tubular shape in horizontal section having an inner end 32, an outer end 34, and parallel sides 36. The frame sections 14, 16 and 18 are likewise provided with corner posts 30a, 30b, and 30c, respectively, which are identical to the corner posts 30. Each corner post 30 is formed at its inner end 32 with inturned horizontally spaced flanges 38 which cooperate to form a slideway and define a space or groove 40 therebetween. This space 40 is of a size to accommodate a tongue or projection 42 formed on the outer side 34 of the corner post 30.

As a result, the four posts, 30, 30a, 30b, and 30c, at each corner of the tower 10, are interfitted as shown in FIG. 5 with the tongue or projection 42 on each corner post sliding in the groove or space 40 in the adjacent corner post disposed outwardly thereof. Each corner post is integrally formed with parallel ears 44 which project from one side 36 thereof and similar ears 48 which project from the opposite side 36. The ears 44 and 48 are at substantially right angles with respect to each other and the corner post 30 substantially bisects that angle. Braces 50 are connected to the ears 44 and 48 and to each other for connecting the corner posts 30 in the frame section 12. Similar braces 52, 54 and 56 are provided in the sections 14, 16 and 18 for providing stable, sturdy sections which can be relatively telescoped.

As shown in FIGS. 4 and 6, the motor 22 which is suspended from the top of the housing 20, drives a chain 60 which in turn drives a horizontal shaft 62 that is supported on and extends across one end of the section 12. Adjacent its ends, the shaft 62 supports a pair of spools 63 and 64 which are identical and each of which includes a pair of side plates 65 and a central partition 67 which divides the spool into two cable receiving chambers 66 for receiving two parallel closely spaced lift cables 68 and 70 which are identical. The distance between each spool side plate 65 and partition 67 is only slightly greater than the diameter of the cable 68 (FIG. 7). This arrangement prevents binding of the cable on the spool and eliminates any need for a distributor or spreader for cable on the spool. Furthermore, it provides for a close spacing of the cables 68 and 70 which extend from the spool to adjacent corners of the base section 12.

One cable 68 is secured at one end to a bracket 71 on one of the spool side plates 65 and is wound about the spool 64 and extends upwardly across a double pulley unit 72 mounted on the top end of the adjacent corner post 30 and disposed in the plane of the spool 64. From the pulley unit 72 the cable extends downwardly around a pulley 76 mounted on the lower end of the corner post 30a which is slidably supported on the corner post 30 and is disposed at 45° to the plane of the pulley unit 64 (FIG. 5). The cable then extends upwardly across a pulley 80 at the upper end of the corner post 30a, downwardly around a pulley 84 at the lower end of the adjacent corner post 30b, upwardly across a pulley 88 at the upper end of the corner post 30b, and downwardly to the lower end of the adjacent corner post 30c, where the end 92 of the cable 68 is attached to the frame section 18.

The cable 70 for the spool 64 is similarly trained across the pulley unit 72, and across a single pulley unit 74 at the top end of the corner post 30 which is on a line with the first corner post 30a and the spool 64 and is located at the opposite end of the base section 12 from the spool 64. From the pulley 74, the cable 70 extends downwardly about a pulley 78 mounted on the lower end of the adjacent corner post 30a, upwardly about a pulley 82 on the upper end of the corner post 30a, downwardly about a pulley 86 on the lower end of the adjacent corner post 30b, upwardly across a pulley 90 on the upper end of the corner post 30b, and downwardly for attachment of its end 94 to the lower end of the adjacent corner post 30c. The cables 68 and 70 on the spool 63 are similarly attached to the other two corners of each frame section.

When the motor 22 is operated to drive the chain 60 in one direction, all four of the cables 68 and 70 are wound about the pulley units 63 and 64 so as to lift first the frame section 18 to a position in which stops 102 thereon engage stops 104 on the frame section 16 and thereby lift the frame section 16 until stops 106 thereon engage stops 108 on the frame section 14 when the section 16 has been fully lifted. When the section 14 has been lifted upwardly out of the base section 12 to the position shown in FIGS. 1 and 2, a limit switch (not shown) is actuated to shut off the motor 22 to discontinue extension of the tower 10.

All four of the cables 68 and 70 will never break at the same time, and any one cable is strong enough to hold the tower 10 in an extended position when the platform 26 is carrying a normal load. A friction brake 110 is provided for engaging the spool 63 on the shaft 62 in the event the drive chain 60 for the shaft 62 breaks. A brake actuating member 114 operates the brake member 110 in the event the chain 60 breaks.

In the use of the tower 10, the operator manually operates a control mechanism 118 on the platform 26 to actuate the motor 22 to drive the chain 60 to rotate the spools 63 and 64 and thereby raise the tower 10. The control member 118 is connected by an electric line 120 to a line 124 wound about a reel 122 mounted on the bottom side of the platform 26. The line 124 is connected to the motor 22 and the reel 122 is spring-biased in a direction to provide for an automatic winding thereon of the line 124 during descent of the platform 26. Ladder sections 114, one of which is mounted on each of the frame sections 12, 14, 16 and 18 can be utilized for climbing upwardly on the tower 10 to a position on the platform 26.

The motor 20 is of the conventional type which includes an electric brake and a mechanical load brake built into the gear reduction assembly. The brakes are released by operation of the control mechanism 118 to provide for constant speed lowering of the platform 26, as the frame sections 12, 14, 16 and 18 telescope into each other, which can be terminated at any point by operation of the mechanism 118.

From the above description it is seen that this invention provides an improved elevating tower which is formed of telescoping frame sections 12, 14, 16 and 18, each of which is formed of four identical corner posts which are identical to the corner posts in the other sections and are conveniently formed of extruded aluminum to facilitate assembly of the tower 10. By virtue of the fact that the lift cables 68 and 70 are fully enclosed, they are protected from damage and from wear due to exposure at all times. The ends of each corner member are closed by plugs 31 which are frictionally fit within the corner member ends and act to strengthen the corner members.

Although the invention has been described with respect to a preferred embodiment thereof, it is to be understood that it is not to be so limited, since changes can be made therein which are within the scope of the invention as defined by the appended claims.

What is claimed is:

1. In a telescoping tower which includes a base section, intermediate sections one of which is telescopically supported on said base section, and a platform-supporting section telescopically supported on one of said intermediate sections; the improvement which comprises providing substantially hollow upright corner posts for said sections arranged in close telescoping relation, pulleys mounted within said corner posts adjacent the upper end of said base and adjacent the upper and lower ends of said intermediate sections said pulleys communicating with the interior of a next adjacent post, respectively, lift cables extending about said pulleys and through said corner posts and connected to the lower end of said platform section, and means connected to said cables for pulling said cables about said pulley thereby to move said sections upwardly to extend said tower, said cables being substantially fully enclosed by said corner posts, respectively.

2. A tower in accordance with claim 1, each corner member consisting of an upright hollow body having four sides; said body having groove means formed in one side and upright tongue means formed on the opposite side and ears integral with the remaining sides of said body and extending outwardly therefrom, and brace members connected to said ears.

3. A tower comprising vertically extending telescoping sections of a rectangular shape in horizontal section, each of which includes identical upright corner members and brace members connected to and extending between said corner members, coacting tongue and groove means on the corner members for adjacent sections for guiding the upper section in each pair of sections during up and down movement thereof relative to the lower section in the pair, said tongue and groove means being disposed in vertical planes extending diagonally of said sections, and lift cables and motor and pulley means operatively associated with said sections for extending said sections upwardly from relatively nested positions, said pulley means being enclosed by and extending between adjacent ones of said upright corner members, respectively, whereby said lift cables are substantially enclosed.

4. A tower comprising vertically extending telescoping sections of a rectangular shape in horizontal section, each of which includes identical upright corner members and brace members connected to and extending between said corner members, coacting tongue and groove means on the corner members for adjacent sections, pulleys mounted on said corner members and extending into adjacent ones of the corner members, respectively, through the groove means therein, a cable member for each corner of said tower trained about the pulleys mounted on the corresponding corners of said sections and connected to the uppermost one of said sections, portion of said cable on opposite sides of said pulleys extending in adjacent ones of said corner members, respectively, a drive shaft mounted on the lowermost one of said sections and disposed substantially perpendicular to a pair of parallel lines extending between two pairs of adjacent corners, a pair of spools mounted on said drive shaft at positions substantially on said lines, each of said spools having a pair of closely spaced cable receiving chambers each of which is of a width slightly greater than the diameter of said cable, and means connecting said cables to said spools so that each cable is disposed in a chamber.

5. A tower comprising vertically extending telescoping sections of a rectangular shape in horizontal section, each of which includes identical upright hollow corner members and brace members connected to and extending between said corner members, coacting tongue and groove means on the corner members for adjacent sections, pulleys mounted on said corner members and extending into a next adjacent one of said corner members, respectively, a cable member for each corner of said tower trained about the pulleys mounted on the corresponding corners of said sections and extending upwardly through said hollow corner members and connected to the uppermost one of said sections, a drive shaft mounted on the lowermost one of said sections and disposed substantially perpendicular to a pair of parallel lines extending between two pairs of adjacent corners, a pair of spools mounted on said drive shaft at positions substantially on said lines, each of said spools having a pair of closely spaced cable receiving chambers, and said cables for the tower corners in each pair of corners being connected to one of said spools so that each cable is disposed in a chamber.

6. In a telescoping tower which includes a base section, a platform supporting section and at least one intermediate section arranged therebetween, each of said sections having two pairs of upright hollow corner posts of rectangular cross section and arranged in a rectangular array, diagonally opposite ones of the corner posts in each pair being substantially coplanar, said sections being positioned in a relatively telescoped relation for movement between positions nested within said base section and positions extending upwardly therefrom; four lift cables connected to the lower end of the platform section, pulley means mounted in each of said corner posts, a pair of coaxial spool members corresponding to said pairs of corner posts, each spool member including a pair of side-by-side cable receiving chambers located adjacent the plane of the corresponding pair of corner posts, each of said cables extending within the posts at corresponding corners of said sections and being trained about the pulleys on said posts and about the spool member corresponding to said corner posts, each cable being disposed in a single spool chamber, and each chamber being of a width slightly greater than the diameter of the cable therefor and less than twice the diameter of said cable therefor and less than twice the diameter of said cable.

References Cited in the file of this patent

UNITED STATES PATENTS

| | | |
|---|---|---|
| 524,476 | Austin | Aug. 14, 1894 |
| 2,465,199 | Cohen | Mar. 22, 1949 |
| 2,576,389 | Craighead et al. | Nov. 27, 1951 |
| 2,763,339 | North | Sept. 18, 1956 |

FOREIGN PATENTS

| | | |
|---|---|---|
| 248,272 | Italy | May 12, 1926 |